(12) United States Patent
Choi et al.

(10) Patent No.: US 10,108,388 B2
(45) Date of Patent: Oct. 23, 2018

(54) DISPLAY APPARATUS AND CONTROLLING METHOD THEREOF

(71) Applicant: SAMSUNG ELECTRONICS CO., LTD., Suwon-si, Gyeonggi-do (KR)

(72) Inventors: Jae-hyuk Choi, Suwon-si (KR); Ji-yeon Park, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 78 days.

(21) Appl. No.: 15/260,566

(22) Filed: Sep. 9, 2016

(65) Prior Publication Data
US 2017/0102909 A1 Apr. 13, 2017

(30) Foreign Application Priority Data
Oct. 12, 2015 (KR) ........................ 10-2015-0142192

(51) Int. Cl.
G06F 3/0488 (2013.01)
G06F 3/14 (2006.01)
G06F 3/041 (2006.01)

(52) U.S. Cl.
CPC .......... *G06F 3/1431* (2013.01); *G06F 3/0416* (2013.01); *G06F 3/1446* (2013.01); *G06F 3/0488* (2013.01); *G09G 2340/045* (2013.01); *G09G 2356/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,460,689 B2 * | 10/2016 | Lee | ........................... | G09G 5/12 |
| 9,513,697 B2 * | 12/2016 | Hayashi | .................... | G06F 3/01 |
| 9,826,078 B2 * | 11/2017 | Kim | .................. | H04M 1/72527 |
| 2010/0283742 A1 | 11/2010 | Lam | | |
| 2011/0143769 A1 | 6/2011 | Jones et al. | | |
| 2011/0209103 A1 | 8/2011 | Hinckley et al. | | |
| 2013/0090065 A1 | 4/2013 | Fisunenko et al. | | |
| 2013/0244784 A1 | 9/2013 | Assa | | |
| 2016/0196022 A1 | 7/2016 | Matsui | | |

FOREIGN PATENT DOCUMENTS

| | | |
|---|---|---|
| JP | 2015-041245 | 3/2015 |
| JP | 2015-075954 | 4/2015 |
| KR | 10-1398862 | 6/2014 |
| KR | 10-2015-0012945 | 2/2015 |
| WO | 2013/071140 | 5/2013 |

OTHER PUBLICATIONS

Search Report and Written Opinion dated Jan. 16, 2017 in counterpart International Patent Application No. PCT/PCT/KR2016/011153.

* cited by examiner

*Primary Examiner* — Van N Chow
(74) *Attorney, Agent, or Firm* — Nixon & Vanderhye P.C.

(57) ABSTRACT

A display apparatus and a controlling method thereof are provided. The method includes sensing a first touch, in response to the first touch being sensed, transmitting a first signal corresponding to the first touch to at least one peripheral display apparatus, receiving a second signal corresponding to a second touch from a peripheral display apparatus where the second touch corresponding to the first touch is sensed from among the at least one peripheral display apparatus, and performing communication connection with the peripheral display apparatus where the second touch is sensed, using the first signal and the second signal.

18 Claims, 12 Drawing Sheets

DISPLAY APPARATUS AND CONTROLLING METHOD THEREOF

CROSS-REFERENCE TO RELATED APPLICATIONS

This application is based on and claims priority under 35 U.S.C. § 119 to Korean Patent Application No. 10-2015-0142192, filed in the Korean Intellectual Property Office on Oct. 12, 2015, the disclosure of which is incorporated by reference herein in its entirety.

BACKGROUND

1. Field

Aspects of example embodiments relate to a display apparatus and a controlling method thereof, and for example, to a display apparatus which performs communication connection with a peripheral display apparatus based on a sensed input, e.g., a user touch, and a controlling method thereof.

2. Description of Related Art

Conventionally, in order to connect display apparatuses, a complicated process has been required, such as entering a setting menu, selecting a network item, searching a peripheral display apparatus for connection, selecting the corresponding display apparatus, etc.

In addition, when a display apparatus is searched and selected using intrinsic information such as the ID (identification) of the display apparatus, if there are a plurality of peripheral display apparatus, the display apparatus to be connected and the intrinsic information of the display apparatus should be checked which is troublesome and inconvenient.

Accordingly, a method of connect a display apparatus with its peripheral display conveniently and intuitively by inputting a simple user commend such as a touch input is required.

SUMMARY

An aspect of the example embodiments relates to a display apparatus which in response to receiving an input, such as a user touch being sensed, connects a display apparatus and its peripheral display apparatus using the sensed user touch and a controlling method thereof.

According to an example embodiment, a controlling method of a display apparatus is provided including sensing a first touch, in response to the first touch being sensed, transmitting a first signal corresponding to the first touch to at least one peripheral display apparatus, receiving a second signal corresponding to a second touch from a peripheral display apparatus where the second touch corresponding to the first touch is sensed from among the at least one peripheral display apparatus, and performing communication connection with the peripheral display apparatus where the second touch is sensed, using the first signal and the second signal.

The performing communication connection may include, in response to the second signal being received within a predetermined time after the first signal is transmitted, performing communication connection with the peripheral display apparatus where the second touch is sensed.

The method may further include, in response to there being another peripheral display apparatus which is communication-connected with the peripheral display apparatus where the second touch is sensed, performing communication connection with the another peripheral display apparatus.

The method may further include receiving a third signal corresponding to a third touch from another peripheral display apparatus where the third touch corresponding to the first touch and the second touch is sensed from among the at least one peripheral display apparatus and performing communication connection with the another peripheral display apparatus where the third touch is sensed, using the first to the third signals.

The method may further include displaying an image by the display apparatus, and the performing communication connection may further include displaying part of the image after communication connection is performed between the display apparatus and the peripheral display apparatus, transmitting information regarding a remaining area of the image to the peripheral display apparatus.

The first touch may be to swipe at a center of the display apparatus in a direction of first edge, and the second touch may be to swipe at a second edge which is at a closest distance from the first edge from among edges of the peripheral display apparatus in a center direction of the peripheral display apparatus.

The first touch and the second touch may be a same type of touch.

The first touch may be a touch in a first pattern, and the second touch may be a touch in a second pattern which is symmetrical to the first pattern.

The first touch may be a touch of touching a first area of the display apparatus, and the second touch may be a touch of touching a second area of the peripheral display apparatus.

According to an example embodiment, a display apparatus including a sensor configured to sense a touch, communication circuitry configured to transmit or receive a signal to or from a peripheral display, and a processor configured to transmit a first signal corresponding to the first touch to at least one peripheral apparatus in response to a first touch being sensed through the sensor, and to perform a communication connection with the peripheral display apparatus where the second touch is sensed, using the first signal and the second signal, in response to a second signal corresponding to a second touch via the communication circuitry from a peripheral display apparatus where the second touch corresponding to the first touch from among the at least one peripheral display apparatus.

The processor, in response to the second signal being received within a predetermined time after the first signal is transmitted, may be configured to control the communication circuitry to perform a communication connection with the peripheral display apparatus where the second touch is sensed.

The processor, in response to there being another peripheral display apparatus which is communication-connected with the peripheral display apparatus where the second touch is sensed, may control the communication circuitry to perform communication connection with the another peripheral display apparatus.

The processor may perform communication connection with the another peripheral display apparatus where the third touch is sensed, using the first to the third signals, in response to a third signal corresponding to a third touch via the communication circuitry from another peripheral display apparatus where the third touch corresponding to the first touch and the second touch is sensed from among the at least one peripheral display apparatus.

The apparatus may further include a display, and the processor may control the display to display part of the image after communication connection is performed between the display apparatus and the peripheral display apparatus, and control the communication circuitry to transmit information regarding a remaining area of the image to the peripheral display apparatus.

The first touch may be to swipe at a center of the display apparatus in a direction of first edge, and the second touch may be to swipe at a second edge which is at a closest distance from the first edge from among edges of the peripheral display apparatus in a center direction of the peripheral display apparatus.

The first touch and the second touch may be a same type of user touch.

The first touch may be a touch in a first pattern, and the second touch may be a touch in a second pattern which is symmetrical to the first pattern.

The first touch may be a touch of touching a first area of the display apparatus, and the second touch may be a touch of touching a second area of the peripheral display apparatus.

As described above, according to various example embodiments, a communication connection between a display apparatus and a peripheral display apparatus may be realized more easily and conveniently through a touch input.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein.

DETAILED DESCRIPTION

Figure 1:
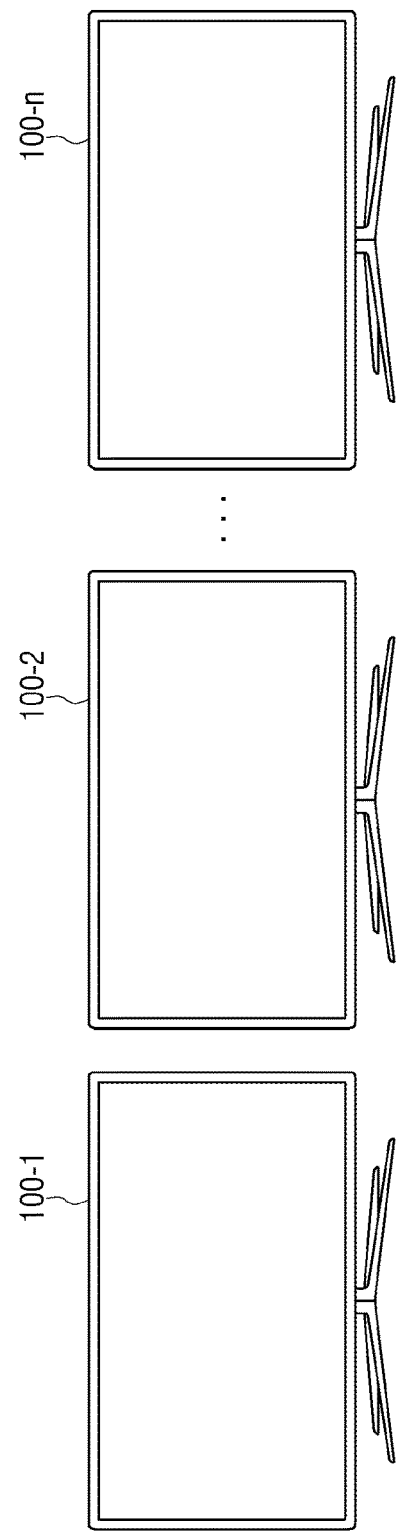
FIG. 1 is a system view illustrating an example connection system according to an example embodiment.

Hereinafter, various example embodiments will be described in greater detail with reference to the accompanying drawings.

The terms used in the example embodiments of the present disclosure are general terms which are widely used now and selected considering the functions of the present disclosure. However, the terms may vary depending on the intention of a person skilled in the art, a precedent, or the advent of new technology. In addition, in a specified case, the term may be arbitrarily selected. In this case, the meaning of the term will be explained in the corresponding description. Therefore, the terms used in the present disclosure should be defined based on the meanings of the terms and the descriptions made herein, rather than the names of the terms.

The term such as "first" and "second" used in various example embodiments may modify various elements regardless of an order and/or importance of the corresponding elements, and does not limit the corresponding elements. These terms may be used for the purpose of distinguishing one element from another element. For example, a first element may be named a second element without departing from the scope of right of various example embodiments, and similarly, a second element may be named a first element. The term of and/or includes combination or one of a plurality of related items recited.

In addition, in an example embodiment, unless otherwise specified, the singular forms are intended to include the plural forms as well.

In an example embodiment, the terms, "include", "comprise", etc. of the description are used to indicate that there are features, numbers, steps, operations, elements, parts or combination thereof, and they should not exclude the possibilities of combination or addition of one or more features, numbers, steps, operations, elements, parts or combination thereof.

In an example embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor (not shown) except for 'modules' or 'units' that should be realized in a specific hardware.

It will be understood that when an element is "coupled with/to" or "connected with" another element the element may be "directly coupled with/to" another element, and may be "coupled to electrically" with an intervening element in-between.

According to an example embodiment, an input, e.g., a user input, may include at least one of a touch input, a bending input, a voice input, a button input and a multimodal input, but is not limited thereto.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various example embodiments. According to circumstances, even the terms defined in the example embodiments should not be interpreted as excluding the embodiments of the present disclosure.

An example embodiment will be described with reference to accompanying drawings. FIG. 1 is a system view illustrating an example connection system of a display apparatus according to an example embodiment. As illustrated in FIG. 1, a connection system 10 includes a plurality of display apparatuses 100-1, 100-2, 100-$n$. In this case, the display apparatuses 100-1, 100-2, 100-$n$ may be implemented as a smart TV, but this is only an example. The display apparatuses 100-1, 100-2, 100-$n$ may be implemented as various electronic apparatuses such as smart phone, desktop PC, tablet PC, notebook PC, etc.

The display apparatus 100-1 may sense a first touch, including, for example, a first user touch and transmit a first signal corresponding to the sensed user touch to at least one peripheral display apparatus 100-2, 100-$n$. In this case, the first user touch may a touch starting from a center of the display apparatus 100-1 to swipe in a first edge direction. Alternatively, the first user touch may be a touch of drawing a predetermined first pattern.

The peripheral display apparatus 100-2 may sense a second touch, such as, for example, a second user touch corresponding to the first user touch and transmit a second signal corresponding to the sensed user touch to another peripheral display apparatus which is different from the display apparatus 100-1. In this case, if the first user touch is a touch of swiping in the direction of first edge starting from the center of the display apparatus, the second user touch corresponding to the first user touch may be a touch of swiping in the direction of the center of the peripheral display apparatus starting from the second edge which is at the closest distance from the first edge from among edges of the peripheral display apparatus. In addition, the first user touch and the second user touch corresponding to the first user touch may be the same type of user touch such as tapping twice in a row.

The display apparatus 100-1 may receive a second signal corresponding to a second user touch from the peripheral display apparatus 100-2 where the second user touch corresponding to the first user touch is sensed.

The display apparatus 100-1 may perform communication connection with the peripheral display apparatus 100-2 where the second user touch is sensed, using the first and the second signals.

Figure 2:
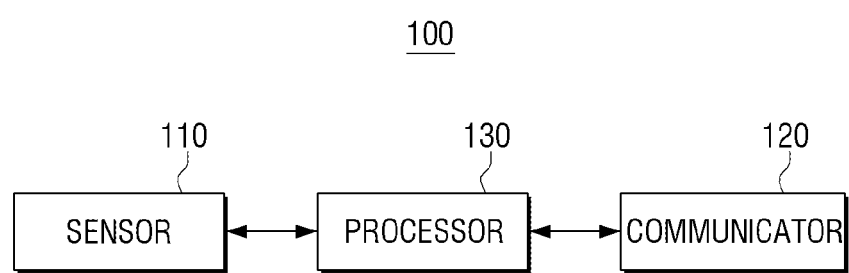
FIG. 2 is a block diagram illustrating an example configuration of a display apparatus according to an example embodiment.

FIG. 2 is a block diagram illustrating an example configuration of the display apparatus 100 according to an example embodiment. As illustrated in FIG. 2, the display apparatus 100 includes a sensor 110, a communicator (e.g., including communication circuitry) 120 and a processor 130. Meanwhile, the display apparatus 100 according to an example embodiment may be implemented as a smart TV, but this is only an example. The display apparatus 100 may be realized as various electronic apparatuses such as smart phone, desktop PC, tablet PC, notebook PC, etc.

The sensor 110 senses an environment around the display apparatus 100. In particular, the sensor 110 may sense a user touch to connect a plurality of display apparatuses.

The communicator 120 performs communication with a peripheral display apparatus via various communication circuitry. In particular, the communicator 120 may transmit/receive a signal corresponding to a user touch to/from at least one peripheral display apparatus.

The processor 130 controls the overall operations of the display apparatus 100. In particular, the processor 130 may transmit the first signal corresponding to the first user touch which is sensed through the sensor 110 to at least one peripheral display apparatus, and receive the second signal corresponding to the second user touch from the peripheral display apparatus where the second user touch corresponding to the first user touch is sensed. The processor 130 may perform communication connection with the peripheral display apparatus where the second user touch is sensed, using the first and the second signals.

Specifically, the processor 130 may control the communication circuitry of the communicator 120 to transmit the first signal corresponding to the first user touch which is sensed through the sensor 110 to at least one peripheral display apparatus.

The processor 130 may control the communication circuitry of the communicator 120 to receive the second signal corresponding to the second touch from the peripheral display apparatus where the second user touch corresponding to the first user touch is sensed from among the at least one peripheral display apparatus. For example, if the first user touch is a touch of swiping in the first edge direction starting from the center of the display apparatus, the second user touch corresponding to the first user touch may be a touch of swiping in the center direction of the peripheral display apparatus starting from the second edge which is at the closest distance from the first edge from among edges of the peripheral display apparatus. In another example, the first user touch and the second user touch corresponding to the first user touch may be the same type of user touch such as tapping twice in a row. Alternatively, if the first user touch is a user touch in the first pattern, the second user touch corresponding to the first user touch may be a user touch in the second pattern which is in line symmetry with respect to the first pattern. As another example, if the first user touch is a user touch of touching the first area which is a specific area of the display apparatus, the second user touch corresponding to the first user touch may be a user touch of touching the second area which is a specific area of the peripheral display apparatus.

The processor 130 may control the communication circuitry of the communicator 120 to perform communication connection with the peripheral display apparatus where the second user touch is sensed, using the first and the second signals. In particular, if the second signal is received within a predetermined time after the first signal is transmitted to the peripheral display apparatus, the processor 130 may control the communicator 120 to perform communication connection with the peripheral display apparatus where the second user touch is sensed. For example, if the second signal is received within 2 seconds after the first signal is transmitted to the peripheral display apparatus, the processor 130 may control the communicator 120 to perform communication connection with the peripheral display apparatus which has transmitted the second signal.

If the display apparatus 100 transmits the first signal corresponding to the first user touch which is sensed through the sensor 110 while displaying an image and receives the second signal from the peripheral display apparatus where the second user touch corresponding to the first user touch is sensed, the processor 130 may control the communicator 120 such that communication connection is performed between the display apparatus 100 and the peripheral display apparatus. If communication connection is performed between the display apparatus 100 and the peripheral display apparatus, the processor 130 may control the display to display part of the displayed image and control the communicator 120 to transmit information regarding a remaining area of the displayed area to the peripheral display apparatus.

If there is another peripheral display apparatus which is communication-connected with the peripheral display apparatus before the communication connection is performed between the display apparatus 100 and the peripheral display apparatus where the second user touch is sensed, the processor 130 may control the communication circuitry of the communicator 120 to perform communication connection with the peripheral display apparatus where the second user touch is sensed and perform communication connection with the another peripheral display apparatus as well.

If a third signal corresponding to a third touch, such as, for example, a third user touch is received from another peripheral display apparatus where the third user touch corresponding to the first user touch and the second user touch is received through the communicator 120 from among peripheral display apparatuses, the processor 130 may control the communicator 120 to perform communication connection with the another peripheral display apparatus where the third user touch is sensed, using the first to the third signals.

As described above, according to the above-described display apparatus 100, a user may perform communication connection between the display apparatus 100 and the peripheral display apparatus using a minimum and/or reduced user input.

Figure 3:
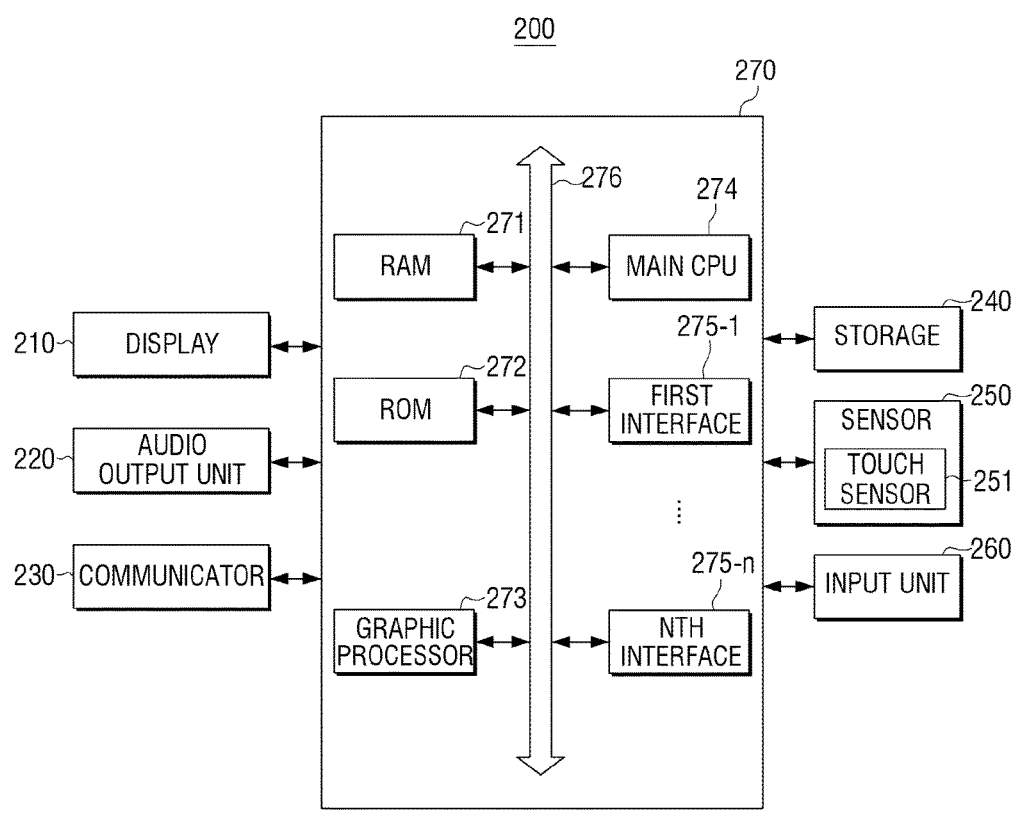
FIG. 3 is a block diagram illustrating an example configuration of a display apparatus according to an example embodiment.

Hereinafter, various example embodiments will be described with reference to FIGS. 3 to 11. FIG. 3 is a block diagram illustrating an example configuration of a display apparatus 200 in greater detail according to an example embodiment. As illustrated in FIG. 3, the display apparatus 200 includes a display 210, an audio output unit 220, a communicator (e.g., including communication circuitry) 230, a storage 240, a sensor 250, an input unit (e.g., including input circuitry) 260 and a processor 270.

Meanwhile, FIG. 3 illustrates various elements in a comprehensive manner, assuming that the display apparatus 200 provides various functions such as a touch sense function, a signal transmission/reception function, a display function, etc. Accordingly, depending on example embodiments, some of the elements illustrated in FIG. 3 may be omitted or changed, and other elements may be added.

The display 210 displays at least one of video frames which have been processed by an image processor (not shown) after image data is received from an image receiver (not shown) and various screens generated by a graphic processor 273. In particular, the display 210 may be communication-connected to a peripheral display apparatus and display part of a displayed area.

The audio output unit 220 outputs not only various audio data for which various processing such as decoding, amplification or noise filtering has been performed by an audio processor (not shown) but also various notification sounds or voice messages. In particular, the audio output unit 220 is realized as a speaker, but this is only an example. The audio output unit 220 may be realized as an output terminal which can output audio data.

The communicator 230 is an element including communication circuitry configured or configurable to perform communication with various types of external devices according to various types of communication methods. The communicator 230 may include various communication circuitry, such as, for example, and without limitation, communication chips such as a WiFi chip, a Bluetooth chip, an NFC chip, a wireless communication chip, etc. in this case, each of the WiFi chip, the Bluetooth chip and the NFC chip performs communication according to a WiFi method, a Bluetooth method and an NFC method, respectively. The NFC chip refers to a chip which operates according to the NFC method using a band of 13.56 MHz from among various RF-ID frequency bands such as 135 kHz, 13.56 MHz, 433 MHz, 860~960 MHz, 2.45 GHz, etc. When the WiFi chip or the Bluetooth chip is used, a variety of connectivity information such as SSID and a session key may be transmitted and received first, and communication is established using the connectivity information, and then a variety of information may be transmitted and received. The wireless communication chip refers to a chip which performs communication according to various communication standards such as IEEE, Zigbee, $3^{rd}$ Generation (3G), $3^{rd}$ Generation Partnership Project (3GPP), Long Term Evolution (LTE), etc.

In particular, the communicator 230 may transmit/receive a signal corresponding to a user touch to/from at least one peripheral display apparatus using various communication circuitry. In addition, the communicator 230 may transmit/receive information regarding a display apparatus (for example, information regarding a sensed user touch, information regarding a content which is currently displayed, etc.) through a near-field communication to/from a peripheral display apparatus.

The storage 240 stores various modules to drive the display apparatus 200. For example, the storage 240 may store software including a base module, a sensing module, a communication module, a presentation module, a web browser module, and a service module. In this case, the base module refers to a basic module which processes a signal transmitted from each hardware included in the display apparatus 200 and transmits the processed signal to an upper layer module. The sensing module is a module which collects information from various sensors, and analyzes and manages the collected information, and may include a face recognition module, a voice recognition module, a motion recognition module, an NFC recognition module and so on. The presentation module is a module to compose a display screen, and may include a multimedia module to play and output a multimedia content and a UI rendering module which performs UI and graphic processing. The communication module is a module for performing communication with an external device. The web browser module refers to a module which performs web browsing and accesses a web server. The service module is a module including various applications to provide various services.

As described above, the storage 240 may include various program modules, but some of those program modules may be omitted or changed, or new program modules may be added depending on the type and characteristics of the display apparatus 200. For example, if the above-described display apparatus 200 is realized as a tablet PC, the base module may further include a location determination module to determine a GPS-based location, and the sensing module may further include a sensing module which senses a user's operation.

Meanwhile, according to an example embodiment, the storage 240 may be defined to include a ROM 272 in the controller 270, a RAM 271 or a memory card which is mounted on the display apparatus 200 (not shown) (for example, a micro SD card, memory stick).

As illustrated in FIG. 3, the sensor 250 includes various sensing circuitry, such as, for example, and without limitation, a touch sensor 251 and senses an environment around the display apparatus 200. In particular, the sensor 250 may sense a user touch using the principles of capacitance variation, electrical conductivity variation (resistance variation), light variation, etc. In addition, the sensor 250 may include various sensors such as a motion sensor to sense the motion of the electronic apparatus 200 (for example, a gyro sensor, an acceleration sensor, etc.), a pressure sensor, a noise sensor, etc.

The input unit 260 receives a user command to control the electronic apparatus 200. In particular, the input unit 260 may include various input apparatuses such as a touch input unit, a button, a voice input unit, a motion input unit, a keyboard, a mouse, etc. to receive a user command.

The controller 270 controls the overall operations of the display apparatus 200 using various programs stored in the storage 240.

As illustrated in FIG. 3, the controller 270 includes a RAM 271, a ROM 272, a graphic processor 273, a main CPU 274, first to nth interfaces 275-1~275-n, and a bus 276. In this case, the RAM 271, the ROM 272, the graphic processor 273, the main CPU 274, the first to the nth interface 275-1~275-n may be connected to each other through the bus 276.

The ROM 272 stores a set of commands for system booting. If a turn on command is input and thus power is supplied, the main CPU 274 copies the O/S stored in the storage 240 to the RAM 271 and executes the O/S according to the command stored in the ROM 272, thereby booting the system. If the booting is completed, the main CPU 274 copies various application programs stored in the storage 240 to the RAM 271 and executes the application programs copied to the RAM 271, thereby performing various operations.

The graphic processor 273 generates a screen including various objects such as an icon, an image, a text, etc. using an operator (not illustrated) and a renderer (not illustrated). The operator (not illustrated) operates attribute values, such as coordinate values, forms, sizes, and colors by which each object is displayed according to a layout of the screen based on a received control command. The renderer (not illustrated) generates a screen of various layouts including an object based on the attribute values calculated by the operator. The screen generated by the renderer (not illustrated) is displayed on a display area of the display 210.

The main CPU 274 accesses the storage 240 and performs booting using Operating System (O/S) stored in the storage 240. In addition, the main CPU 274 performs various operations using various programs, contents, data, etc. stored in the storage 240.

The first to the nth interfaces 275-1 to 275-n are connected to the above-described various elements. One of the interfaces may be a network interface which is connected to an external apparatus via network.

In particular, if the first user touch is sensed through the sensor 250, the processor 270 controls the communicator 230 to transmit the first signal corresponding to the first user touch to at least one peripheral display apparatus. The processor 270 controls the communicator 230 to receive the second signal corresponding to the second user touch from the peripheral display apparatus where the second user touch corresponding to the first user touch is sensed from among peripheral display apparatuses. In addition, the processor 270 controls the communicator 230 to perform communication connection with the peripheral display apparatus where the second user touch is sensed, using the first signal and the received second signal.

Specifically, if the first user touch is sensed through the sensor 250, the processor 270 may control the communicator 230 to transmit the first signal corresponding to the first user touch to at least one peripheral display apparatus. In this case, the first user touch may be a touch input of swiping in the direction of an edge starting from the center of the display apparatus 200 based on a swipe touch using two fingers, but this is only an example. The first user touch may be a touch of swiping using one finger, a touch of drawing a predetermined pattern, etc.

The processor 270 may control the communicator 230 to receive the second signal corresponding to the second user touch from the peripheral display apparatus where the second user touch corresponding to the first user touch is sensed from among peripheral display apparatuses.

The first user touch and the second user touch corresponding to the first user touch will be described with reference to FIGS. 4 and 5.

Figure 4:
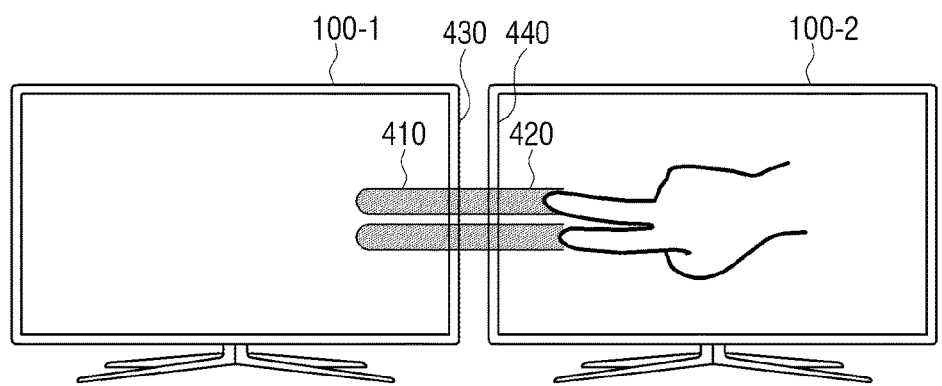
FIGS. 4 to 11 are diagrams illustrating various example embodiments of connecting a display apparatus with its peripheral display apparatus using a touch according to various example embodiments.

Specifically, as illustrated in FIG. 4, a first user touch 410 sensed in the display apparatus 100-1 and a second user touch 420 sensed in the peripheral display apparatus 100-2 may be a swipe touch using two fingers. In this case, the first user touch 410 may be a swipe touch in the direction of a first edge 430 from the center of the display apparatus 100-1, and the second user touch 420 may be a swipe touch in the direction of the center of the peripheral display apparatus 100-2 from a second edge 440 which is at the closest distance from the first edge 430 from among the edges of the peripheral display apparatus 100-2. For example, when the peripheral display apparatus 100-2 is positioned in the right side of the display apparatus 100-1, if the first user touch 410 is a swipe touch in the direction of the right edge 430 from the center of the display apparatus 100-1, the second user touch 420 corresponding to the first user touch 410 may be a swipe touch in the direction of the center of the peripheral display apparatus 100-2 from the direction of the left edge 440 of the peripheral display apparatus 100-2.

Figure 5:
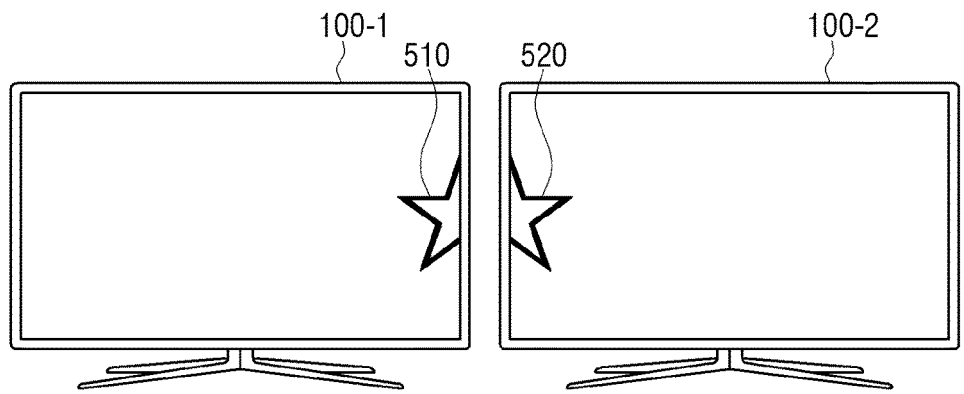

According to another example embodiment, as illustrated in FIG. 5, a first user touch 510 sensed in the display apparatus 100-1 and a second user touch 520 sensed in the peripheral display apparatus 100-2 may be a touch of a predetermined pattern. Specifically, if the first user touch 510 is a touch input of a predetermined first pattern, the second user touch 520 may be a touch input of a second pattern which may be symmetrical to the first user pattern. For example, if the first user touch 510 sensed in the display apparatus 100-1 is a touch input of the first pattern corresponding to the half of a star shape, the second user touch 520 sensed in the peripheral display apparatus 100-2 may be a touch input of the second pattern corresponding to the remaining half of the star shape which is in line-symmetry with the first pattern. In other words, when the shape of the first user touch 510 and the shape of the second user touch 520 are overlapped, it will make a whole star shape. Meanwhile, the shapes of the first user touch 510 and the second user touch 520 may have predetermined various patterns.

According to another example embodiment, if the first user touch is a touch of tapping a display of a display apparatus twice in a row, the second user touch corresponding to the first user touch may be a touch of tapping the display of the peripheral display apparatus twice in a row in the same manner. According to another example embodiment, if the first user touch is a user touch of touching the first area of the display apparatus, the second user touch may be a user touch of touching the second area of the peripheral display apparatus. Here, the first area and the second area may be displayed in a UI which is different from a peripheral display image.

Figure 6:
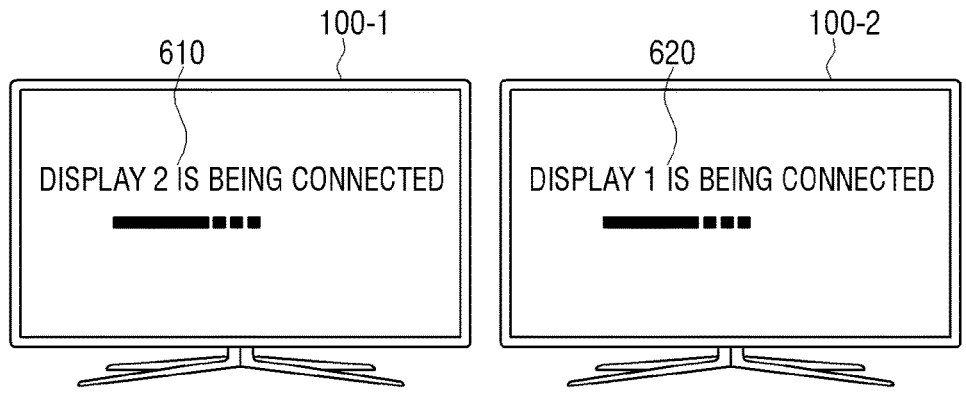

As illustrated in FIG. 6, the processor 270 may control the communicator 230 to perform communication connection with the peripheral display apparatus 100-2 where the second user touch is sensed, using the first signal corresponding to the first user touch sensed through the sensor 250 and the second signal which is received through the communicator 230. The processor 270 may control the display 210 to display a connection guidance message such as 'display X is being connected' 610, 620

According to another example embodiment, the first signal corresponding to the first user touch which is sensed through the sensor 110 is transmitted while the display 210 displays an image and the second signal is received from the peripheral display apparatus where the second user touch corresponding to the first user touch is sensed, the processor 270 may control the communicator 120 such that the display apparatus performs communication connection with the peripheral display apparatus. When the display apparatus 100 and the peripheral display apparatus is communication-connected, the processor 130 may control the display 210 to display part of the displayed image, and control the communicator 120 to transmit information regarding the remaining area of the displayed image to the peripheral display apparatus. Accordingly, one image may be displayed through the display apparatus and at least one peripheral display apparatus.

Figure 7:
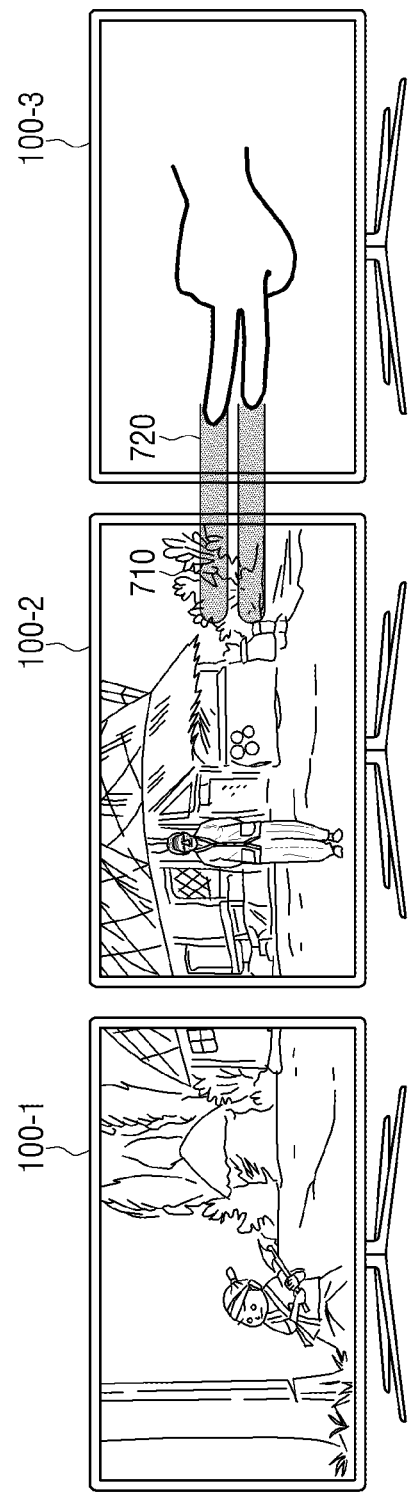

In addition, as illustrated in FIG. 7, if there is another peripheral display apparatus 100-1 which is communication-connected with the peripheral display apparatus 100-2 before the display apparatus 100-3 and the peripheral display apparatus 100-2 where the second user touch is sensed is communication-connected, the processor 270 may control the communicator 230 to perform communication connection with the peripheral display apparatus 100-2 where a second user touch 710 is sensed and perform communication connection with another peripheral display apparatus 100-1. Accordingly, the processor 270 may control the communicator 230 to perform communication connection between the display 110-3 and another peripheral display apparatus 100-1 without a user command to perform communication connection between the display apparatus 100-3 and another peripheral display apparatus 100-1. In the above example embodiment, it is assumed that there is only one another peripheral display apparatus 100-1 which is connected previously with the peripheral display apparatus 100-2, but this is only an example. There may be a plurality of peripheral display apparatuses.

Figure 8:
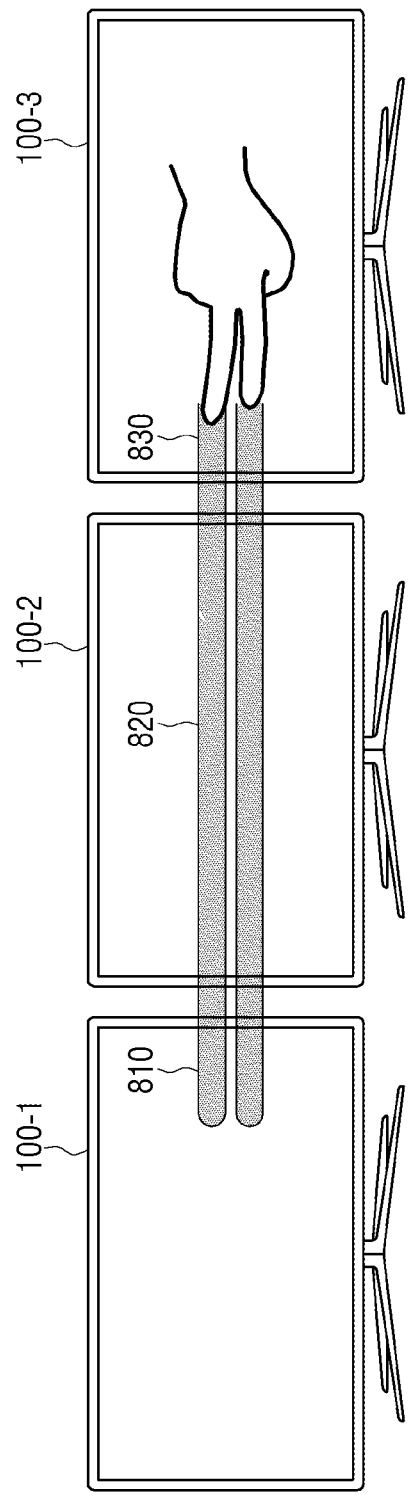
Figure 9:
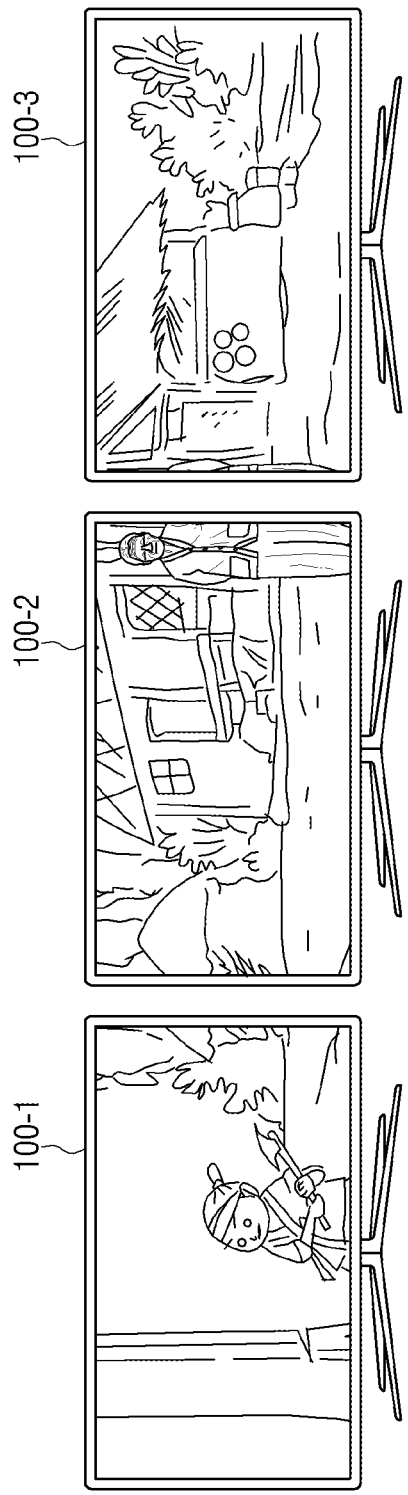

In addition, if the third signal corresponding to a third user touch 830 is received through the communicator 230 from another peripheral display apparatus 100-3 where the third user touch 830 corresponding to a first user touch 810 and a second user touch 820 is sensed, the processor 270 may control the communicator 230 to perform communication connection with another peripheral display apparatus 100-3 where the third user touch 830 is sensed, using the first to the third signals. For example, as illustrated in FIG. 8, the first user touch 810 which is a touch of swiping in the direction of the right edge from the center of the display apparatus 100-1 and the second user touch 820 which is a touch of swiping in the direction from the left edge of the peripheral display apparatus 100-2 to the right edge may be sensed. If the third touch 830 which is a touch of swiping in the center direction from the left edge which is at the closest distance from the right edge of the peripheral display apparatus 100-2 from among the edges of another peripheral display apparatus 100-3 to correspond to the first user touch 810 and the second user touch 820 is sensed, the third signal corresponding to the third user touch 830 may be received through the communicator 230 from another peripheral display apparatus 100-3 where the third touch 830 is sensed. If the third signal is received through the communicator 230, as illustrated in FIG. 9, the processor 270 may control the communicator 230 to perform communication connection with the peripheral display apparatus 100-2 using the first to the third signals and perform communication connection with another peripheral display apparatus 100-3 as well.

According to another example embodiment, if the first signal corresponding to the first user touch which is sensed through the sensor 110 while the display 210 displays an image is transmitted, the second signal is received from the peripheral display apparatus where the second user touch corresponding to the first user touch is sensed, and the third signal corresponding to the third user touch is received from another peripheral display apparatus where the third user touch corresponding to the first user touch and the second user touch is sensed, the processor 270 may control the communicator 120 such that the display apparatus performs communication connection with the peripheral display apparatus and another peripheral display apparatus. When the display apparatus 100 is communication-connected with the peripheral display apparatus and another peripheral display apparatus, the processor 130 may control the display 210 to display part of the displayed image and control the communicator 120 to transmit information regarding the part of the remaining area of the displayed image to the peripheral display apparatus and transmit information regarding the remaining part of the remaining area to another peripheral display apparatus. Accordingly, one image may be displayed through the display apparatus and at least one peripheral display apparatus.

Meanwhile, in the above-described example embodiment, the processor 270 performs communication connection based on a user touch which is sensed through the sensor 250, but this is only an example. The processor 270 may perform communication connection through a user command regarding various inputs such as a button input, etc.

Figure 10:
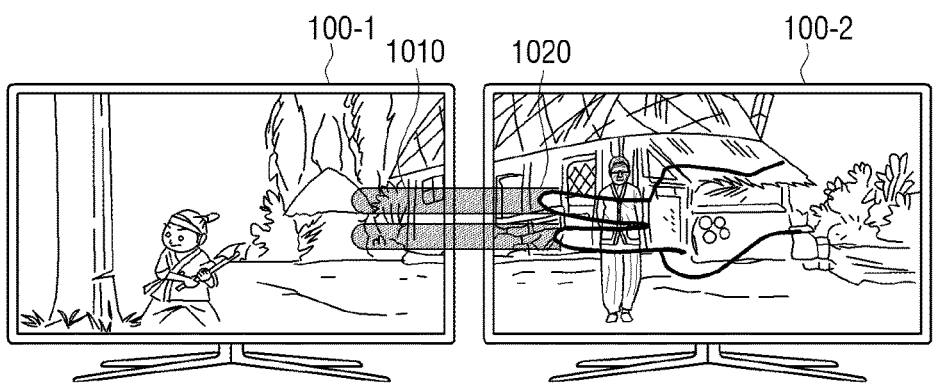

FIG. 10 is a diagram illustrating an example of cutting off communication connection according to an example embodiment. If a first user touch 1010 is sensed while the display apparatus 100-1 and the peripheral display apparatus 100-2 are communication-connected, the processor 270 may control the communicator 230 to transmit the first signal corresponding to the first user touch 1010 to the peripheral display apparatus 100-2 which is communication-connected. The processor 270 may control the communicator 230 to receive the second signal corresponding to a second user touch 1020 from the peripheral display apparatus 100-2 where the second user touch corresponding to the first user touch 1010 is sensed. The processor 270 may control the communicator 230 to cut off communication connection with the peripheral display apparatus 100-2 where the second user touch 1020 is sensed, using the first signal and the second signal.

Figure 11:
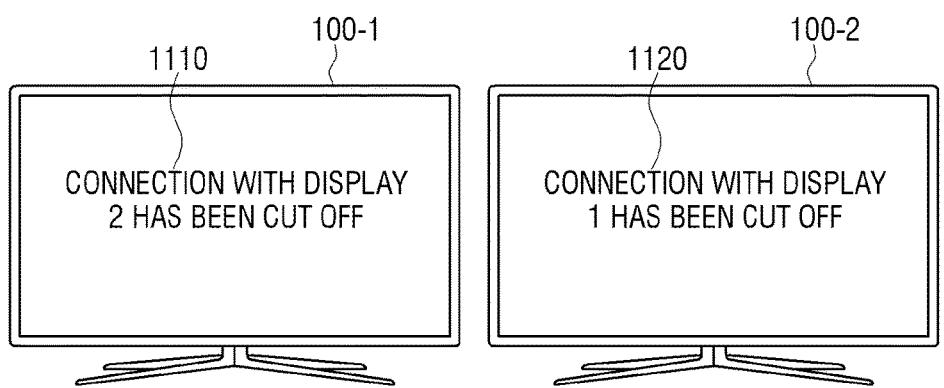

For example, if the first user touch 1010 of swiping in the direction of the right edge from the center of the display apparatus 100-1 is sensed, the processor 270 may control the communicator 230 to transmit the first signal corresponding to the first user touch 1010 to the peripheral display apparatus 100-2. The processor 270 may control the communicator 230 to receive the second signal corresponding to the second user touch 1020 from the peripheral display apparatus 100-2 where the second user touch 1020 of swiping in the direction of the center from the right edge which is at the closest distance from the right edge of the display apparatus 100-1 from among the edges of the peripheral display apparatus 100-2 corresponding to the first user touch 1010. In addition, as illustrated in FIG. 11, the processor 270 may control the communicator 230 to cut off communication with the peripheral display apparatus 100-2 where the second user touch 1020 is sensed, using the first signal and the second signal. The processor 270 may control the display 210 to display a connection cutoff guidance message, 'connection with the peripheral display apparatus 100-2 has been cut off' 1110, 1120

Figure 12:
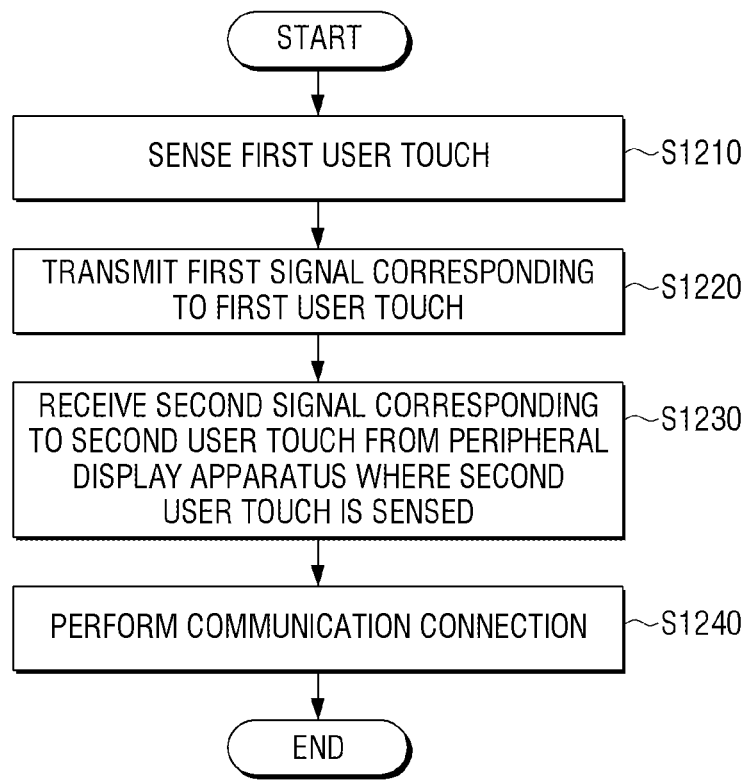
FIG. 12 is a flowchart illustrating an example method of controlling a display apparatus according to an example embodiment.

Hereinafter, the method of controlling the display apparatus 100 according to an example embodiment will be described with reference to FIG. 12.

First of all, the display apparatus 100 senses the first user touch (S1210). In this case, the first user touch may be a touch of swiping in the direction of the first edge starting from the center of the display apparatus 100.

When the first user touch is sensed, the display apparatus 100 may transmit the first signal corresponding to the first user touch to at least one peripheral display apparatus (S1220).

The display apparatus 100 may receive the second signal corresponding to the second user touch from the peripheral display apparatus where the second user touch corresponding to the first user touch is sensed from among at least one peripheral display apparatus (S1230). In this case, if the first user touch is the touch of swiping in the direction of the first edge starting from the center of the display apparatus, the second user touch corresponding to the first user touch may be the touch of swiping in the central direction of the peripheral display apparatus starting from the second edge which is at the closest distance from the first edge from among the edges of the peripheral display apparatus. Alternatively, the first user touch and the second user touch corresponding to the first user touch may be the same type of user touch of tapping twice in a row.

The display apparatus 100 may perform communication connection with the peripheral display apparatus where the second user touch is sensed, using the first signal and the second signal (S1240).

According to the above-described various example embodiments, a user may perform connection between a display apparatus and a peripheral display apparatus more conveniently with a minimum input.

Meanwhile, the above-described method may be written as a program executable in a computer and may be implemented in a universal digital computer where the above program is operated using a computer-readable recording medium. In addition, the data structure used in the above-described method may be recorded in a computer-readable recording medium using various means. The computer-readable recording medium includes a storage medium such as a magnetic storage medium (for example, ROM, floppy disk, hard disk, etc.) and an optical readable medium (for example, CD-ROM, DVD, etc.).

The foregoing example embodiments and advantages are merely examples and are not to be construed as limiting the present disclosure. The present teaching can be readily applied to other types of apparatuses. Also, the description of the example embodiments of the present disclosure is intended to be illustrative, and not to limit the scope of the claims, and many alternatives, modifications, and variations will be apparent to those skilled in the art.

What is claimed is:

1. A method of controlling a display apparatus, comprising:
    displaying an image content on a first display of the display apparatus;
    sensing a first touch gesture while the image content is displayed on the first display, the first touch gesture comprising a swipe from an inside area of the first display to an edge of the first display;
    in response to the first touch gesture being sensed, transmitting a first signal corresponding to the first touch gesture to at least one peripheral display apparatus;
    receiving a second signal corresponding to a second touch gesture from one of the at least one peripheral display apparatus having a second display, the second touch gesture comprising a swipe from an edge of the second display to an inside area of the second display;
    performing communication connection with the one of the at least one peripheral display apparatus where the second touch gesture is sensed, using the first signal and the second signal; and
    transmitting information regarding the image content to the one of the peripheral display apparatus.

2. The method as claimed in claim 1, wherein the performing communication connection comprises, performing communication connection with the peripheral display apparatus where the second touch gesture is sensed in response to the second signal being received within a predetermined time after the first signal is transmitted.

3. The method as claimed in claim 1, further comprising:
    in response to there being another peripheral display apparatus which is communication-connected with the peripheral display apparatus where the second touch is sensed, performing communication connection with the another peripheral display apparatus.

4. The method as claimed in claim 1, further comprising:
    receiving a third signal corresponding to a third touch gesture from another peripheral display apparatus where the third touch gesture corresponding to the first touch gesture and the second touch gesture is sensed from among the at least one peripheral display apparatus; and
    performing a communication connection with the another peripheral display apparatus where the third touch gesture is sensed using the first signal, the second signal and the third signal.

5. The method as claimed in claim 1, further comprising: displaying an image by the display apparatus, wherein the performing communication connection further comprises: displaying part of the image after communication connection is performed between the display apparatus and the peripheral display apparatus, and transmitting information regarding a remaining area of the image to the peripheral display apparatus.

6. The method as claimed in claim 1, wherein the first touch gesture includes a swipe at a center of the display apparatus in a direction of first edge, and the second touch gesture includes a swipe at a second edge which is at a closest distance from the first edge from among edges of the peripheral display apparatus in a center direction of the peripheral display apparatus.

7. The method as claimed in claim 1, wherein the first touch gesture and the second touch gesture is a same type of touch gesture.

8. The method as claimed in claim 1, wherein the first touch gesture is a touch in a first pattern, and the second touch gesture is a touch in a second pattern, said second pattern being substantially symmetrical to the first pattern.

9. The method as claimed in claim 1, wherein the first touch gesture includes touching a first area of the display apparatus, and the second touch gesture includes touching a second area of the peripheral display apparatus.

10. A display apparatus, comprising:
    a sensor configured to sense a touch;
    communication circuitry configured to transmit/receive a signal to/from a peripheral display; and
    a processor configured to:
        transmit a first signal corresponding to a first touch gesture to at least one peripheral apparatus in response to the first touch gesture being sensed by the sensor while image content is displayed on a first display, the first touch gesture comprising a swipe from an inside area of the first display to an edge of the first display, and
        perform a communication connection with the peripheral display apparatus where a second touch gesture is sensed, the second touch gesture comprising a swipe from an edge of the peripheral display to an inside area of the peripheral display, in response to a second signal corresponding to the second touch gesture via the communication circuitry.

11. The apparatus as claimed in claim 10, wherein the processor is configured to control the communication circuitry to perform the communication connection with the peripheral display apparatus where the second touch gesture is sensed in response to the second signal being received within a predetermined time after the first signal is transmitted.

12. The apparatus as claimed in claim 10, wherein the processor is configured to control the communication circuitry to perform a communication connection with another peripheral display apparatus in response to there being another peripheral display apparatus being communication-connected with the peripheral display apparatus where the second touch gesture is sensed.

13. The apparatus as claimed in claim 10, wherein the processor is configured to perform a communication connection with another peripheral display apparatus where a third touch gesture is sensed using the first signal, the second signal and a third signal, in response to the third signal corresponding to the third touch gesture, via the communication circuitry from another peripheral display apparatus where the third touch gesture corresponding to the first touch gesture and the second touch gesture is sensed from among the at least one peripheral display apparatus.

14. The apparatus as claimed in claim 10, further comprising: the first display, wherein the processor is configured to control the first display to display part of the image after communication connection is performed between the display apparatus and the peripheral display apparatus, and to control the communication circuitry to transmit information regarding a remaining area of the image to the peripheral display apparatus.

15. The apparatus as claimed in claim 10, wherein the first touch gesture includes a swipe at a center of the display apparatus in a direction of first edge, and the second touch gesture includes a swipe at a second edge which is at a closest distance from the first edge from among edges of the peripheral display apparatus in a center direction of the peripheral display apparatus.

16. The apparatus as claimed in claim 10, wherein the first touch gesture and the second touch gesture is a same type of touch.

17. The apparatus as claimed in claim 10, wherein the first touch gesture includes a touch in a first pattern, and the second touch gesture includes a touch in a second pattern which is substantially symmetrical to the first pattern.

18. The apparatus as claimed in claim 10, where in the first touch gesture includes touching a first area of the display apparatus, and the second touch gesture includes touching a second area of the peripheral display apparatus.

* * * * *